(12) United States Patent
Bansod

(10) Patent No.: US 10,101,991 B2
(45) Date of Patent: *Oct. 16, 2018

(54) MANAGING A SOFTWARE-PATCH SUBMISSION QUEUE

(71) Applicant: Commvault Systems, Inc., Tinton Falls, NJ (US)

(72) Inventor: Ketan Bansod, South Amboy, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,987

(22) Filed: Jun. 8, 2017

(65) Prior Publication Data

US 2017/0269924 A1    Sep. 21, 2017

Related U.S. Application Data

(63) Continuation of application No. 14/742,566, filed on Jun. 17, 2015, now Pat. No. 9,710,253.

(60) Provisional application No. 62/148,546, filed on Apr. 16, 2015.

(51) Int. Cl.
*G06F 9/445* (2018.01)
*G06F 8/65* (2018.01)

(52) U.S. Cl.
CPC ..................................... *G06F 8/65* (2013.01)

(58) Field of Classification Search
None
See application file for complete search history.

(56) References Cited

U.S. PATENT DOCUMENTS

| | | |
|---|---|---|
| 4,084,231 A | 4/1978 | Capozzi et al. |
| 4,267,568 A | 5/1981 | Dechant et al. |
| 4,283,787 A | 8/1981 | Chambers |

(Continued)

FOREIGN PATENT DOCUMENTS

| | | |
|---|---|---|
| AU | 2004227949 | 10/2004 |
| CA | 2498174 | 3/2004 |

(Continued)

OTHER PUBLICATIONS

Arneson, "Mass Storage Archiving in Network Environments" IEEE, 1998, pp. 45-50.

(Continued)

*Primary Examiner* — Syed Roni
(74) *Attorney, Agent, or Firm* — Commvault Systems, Inc.

(57) ABSTRACT

Queued software patches are analyzed before one patch is chosen as the next patch to be integrated into a working build. The chosen patch might not be next in chronological order of arrival at the queue. Instead, an illustrative build server applies a number of priority factors to every patch awaiting integration in the patch queue, specifically by analyzing one or more relevant attributes of the patch. The patch that receives the highest priority score in the course of the evaluation is then extracted for integration. After the patch has been integrated, the build server (e.g., using an illustrative patch queue manager module) circles back and again evaluates all the patches in the current queue, which may have queued new patches that were submitted while the previous patch was being integrated. Relative to a default chronological order, a given patch may receive a boost in priority or, conversely, may have its priority reduced.

17 Claims, 5 Drawing Sheets

(56) References Cited

U.S. PATENT DOCUMENTS

| | | |
|---|---|---|
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,209,972 B1 | 4/2007 | Ignatius et al. |
| 7,246,207 B2 | 7/2007 | Kottomtharayil et al. |
| 7,315,923 B2 | 1/2008 | Retnamma et al. |
| 7,315,924 B2 | 1/2008 | Prahlad et al. |
| 7,380,072 B2 | 5/2008 | Kottomtharayil et al. |
| 7,389,311 B1 | 6/2008 | Crescenti et al. |
| 7,395,282 B1 | 7/2008 | Crescenti et al. |
| 7,401,154 B2 | 7/2008 | Ignatius et al. |
| 7,409,509 B2 | 8/2008 | Devassy et al. |
| 7,440,982 B2 | 10/2008 | Lu et al. |
| 7,447,692 B2 | 11/2008 | Oshinsky et al. |
| 7,454,569 B2 | 11/2008 | Kavuri et al. |
| 7,484,054 B2 | 1/2009 | Kottomtharayil et al. |
| 7,490,207 B2 | 2/2009 | Amarendran |
| 7,500,053 B1 | 3/2009 | Kavuri et al. |
| 7,536,291 B1 | 5/2009 | Retnamma et al. |
| 7,543,125 B2 | 6/2009 | Gokhale |
| 7,546,324 B2 | 6/2009 | Prahlad et al. |
| 7,581,077 B2 | 8/2009 | Ignatius et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,739,459 B2 | 6/2010 | Kottomtharayil et al. |
| 7,747,579 B2 | 6/2010 | Prahlad et al. |
| 7,757,043 B2 | 7/2010 | Kavuri et al. |
| 7,769,961 B2 | 8/2010 | Kottomtharayil et al. |
| 7,801,864 B2 | 9/2010 | Prahlad et al. |
| 7,802,067 B2 | 9/2010 | Prahlad et al. |
| 7,809,914 B2 | 10/2010 | Kottomtharayil et al. |
| 8,019,872 B2 | 9/2011 | Lora et al. |
| 8,943,183 B2 | 1/2015 | Prahlad et al. |
| 9,609,058 B2 | 3/2017 | Vallabhaneni et al. |
| 9,710,253 B2 | 7/2017 | Bansod |
| 9,800,656 B2 | 10/2017 | Vallabhaneni et al. |
| 2003/0200201 A1 | 10/2003 | Milius |
| 2004/0255291 A1 | 12/2004 | Sierer |
| 2005/0039051 A1 | 2/2005 | Erofeev |
| 2005/0177617 A1 | 8/2005 | Banginwar et al. |
| 2006/0053261 A1 | 3/2006 | Prahlad et al. |
| 2006/0053263 A1 | 3/2006 | Prahlad et al. |
| 2006/0282831 A1 | 12/2006 | Toeroe |
| 2009/0024993 A1 | 1/2009 | Reus et al. |
| 2009/0089781 A1 | 4/2009 | Shingai et al. |
| 2009/0144700 A1 | 6/2009 | Huff et al. |
| 2009/0164201 A1 | 6/2009 | Celli |
| 2010/0131084 A1 | 5/2010 | Van Camp |
| 2011/0138374 A1 | 6/2011 | Pal |
| 2012/0054728 A1 | 3/2012 | Rohde et al. |
| 2013/0275695 A1 | 10/2013 | Ponsford et al. |
| 2015/0169308 A1 | 6/2015 | Prahlad et al. |
| 2015/0178063 A1 | 6/2015 | Narkinsky et al. |
| 2016/0103671 A1 | 4/2016 | Curran et al. |
| 2016/0306618 A1 | 10/2016 | Bansod |
| 2017/0134490 A1 | 5/2017 | Vallabhaneni et al. |
| 2018/0027072 A1 | 1/2018 | Vallabhaneni et al. |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| EP | 1384135 | 1/2004 |
| EP | 1393181 | 3/2004 |
| GB | 2447361 | 9/2008 |
| JP | 4198050 | 12/2008 |
| JP | 4267443 | 5/2009 |
| WO | WO 1995/013580 | 5/1995 |
| WO | WO 1999/012098 | 3/1999 |
| WO | WO 2004/023317 | 3/2004 |
| WO | WO 2006/052872 | 5/2006 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Chan, "Essentials of Patch Management Policy and Practices", PatchManagement.org, Jan. 31, 2004, pp. 1-5.

Eitel, "Backup and Storage Management in Distributed Heterogeneous Environments", IEEE, 1994, pp. 124-126.

IBM Technical Disclosure Bulletin, vol. 24, No. 5, Oct. 1981 New York, US, pp. 2404-2406, K.L. Huff, "Data Set Usage Sequence Number".

Mendel Rosenblum Operating Systems Review (SIGOPS), vol. 25, No. 5, May 1991, New York, US, "The Design and Implementation of a Log-Structured File System", p. 4, paragraph 3.3-p. 5.

Prahlad, et al., U.S. Appl. No. 12/628,890, filed Dec. 1, 2009, Decoupled Installation of Data Management Systems, U.S. Pat. No. 8,943,183.

Prahlad, et al., U.S. Appl. No. 14/568,016, filed Dec. 11, 2014, Decoupled Installation of Data Management Systems, 2015/0169308.

Vallabhaneni, et al., U.S. Appl. No. 14/513,049, filed Oct. 13, 2014, Storage Management Operations Based on Executable Files Served on Demand to Storage Management Components, 2016/0105504.

Bansod, U.S. Appl. No. 14/742,566, filed Jun. 17, 2015, Managing a Software-Patch Submission Queue, 2016/0306618.

FIG. 2   System 200 For Managing A Software Patch Submission Queue

MANAGING A SOFTWARE-PATCH SUBMISSION QUEUE

INCORPORATION BY REFERENCE TO ANY PRIORITY APPLICATIONS

The present application is a Continuation of U.S. Pat. No. 9,710,253 B2 filed on Jun. 17, 2015 and entitled "Managing a Software Patch Submission Queue," which claims the benefit of priority from U.S. Provisional Patent Application Ser. No. 62/148,546, entitled "Managing a Software Patch Submission Queue," filed on Apr. 16, 2015 and incorporated by reference in its entirety herein. Any and all applications, if any, for which a foreign or domestic priority claim is identified in the Application Data Sheet of the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Software development environments are computing environments that support both (i) a production (or "official") platform, and also (ii) informal workspaces that are derived from the official and which developers use on their own private computing devices to develop new features, enhancements, diagnostics, and/or bugfixes. Typically, the production platform comprises a software base (including, e.g., source code, files, configuration parameters, scripts, etc.) for building executable code and/or binary files (the "executable software files"). Executable software file(s) may be provided to customers as an official release, e.g., version 1.0.

A "patch" or "software patch" may be needed after a given official release has been distributed to customers. A patch may functionally comprise new features, enhancements, bugfixes, and/or diagnostics that incrementally modify the official release. Any given patch may contain one or more binary files, which are executable software files. For a new official release to ultimately issue, each patch needs to be "built" so that its component binary file(s) are properly integrated with the existing set of executable software files—this is called a "working build." Thus, a working build is defined by a set of executable software files. A patch takes time to build ranging from a few minutes to a few hours. Patches may have dependencies amongst themselves that prevent them from building in parallel due to functionality reasons, for example. Hence patches need to be queued and hence a requirement for patch-queue management. Typically, a computer (a so-called "build server") may be dedicated to managing patch intake and integration/building. Typically the build server generates and maintains the working build, which incrementally incorporates one patch at a time. The working build and successive working builds may be stored on a storage device such as a storage array. The working build may eventually be closed to new patches and the set of executable software files in the present working build may be distributed to customers as a new official release or service pack, e.g., version 1.1.

Workspaces are private developer copies that may be derived from an official software base. Typically, a developer obtains a copy of the official software base to use as a workspace on her/his own computing device for generating additional software (e.g., source code, files, configuration parameters, scripts, etc.) that may perform a particular function, such as a feature, an enhancement, a bugfix, a diagnostic, etc. The workspace containing the developer's software may be processed into a patch (i.e., including binaries file(s)) and may be submitted for integration into the working build. An exemplary prior-art approach to managing the submission and integration of patches into a working build is presented in FIG. 1 and generally depicts the processing of submitted patches in chronological order as they arrive at the build server in a "first-in first-out" scheme.

FIG. 1 depicts a typical prior-art First-In First-Out ("FIFO") approach to managing patch submissions in a software development environment 100. FIG. 1 depicts: developer machines 102-1 through 102-n; build server 103, comprising patch queue 110 and patch builder-integrator 112; and storage device 104 comprising working build 114. The components may be physically interconnected by any suitable communications infrastructure that is well known in the art, such as the logical communication pathways depicted by bi-directional solid arrows 131-1 and 132. The uni-directional solid arrows depict logical data flows within software development environment 100, which may be supported by the underlying communications infrastructure.

Developer machines 102 (e.g., 102-1, 102-2, 102-3, . . . , 102-n) are computing devices assigned to respective individual developers. A computing device such as developer machine 102 may be, without limitation, a workstation, personal computer, desktop computer, or other type of generally fixed computing system such as a server, mainframe computer, or minicomputer; a mobile or portable or untethered computing device, such as a laptop, a tablet computer, a personal data assistant, a mobile phone (such as a smartphone); and/or another kind of fixed, mobile, or portable computing device such as an embedded computer, set top box, vehicle-mounted device, wearable computer, etc. A developer machine 102 comprises one or more processors (e.g., a CPU comprising one or more processor units and/or single-core or multi-core processor(s), etc.) and non-transitory computer-readable memory (e.g., random access memory (RAM)) for storing executable computer-readable instructions such as computer programs and/or applications that may be executed therefrom by the one or more processors. A developer machine 102 may comprise additional computer-readable memory for mass data storage, e.g., a hard disk, and/or may be associated with and/or have networked access to a mass storage device such as a storage array, e.g., storage device 104. Patches are submitted, usually one patch at a time, for integration into a working build maintained by build server 103, and e.g., working build 114. Each developer machine 102 may communicate with build server 103 via a respective communication pathway 131. A developer machine 102 operating in software development environment 100 may perform one or more of the following functions:

Establish communications with build server 103, e.g., using a respective communication pathway 131.
  Submit one or more software patches, e.g., patch A, patch B, etc., to build server 103 for integration into the working build.

Receive communications from build server 103, e.g., integration and build status.

Build server 103 is a computing device, well known in the art, which is generally directed at maintaining a working build. In the present example, build server 103 may perform one or more of the following functions in software development environment 100:

- Establish communications with one or more developer machines 102, e.g., via respective communication paths 131.
- Establish communications with a storage device, e.g., 104, which stores the official working build, e.g., via communication path 132.
- Receive submitted patches from developer machines 102 and track the received patches in one or more appropriate data structure(s) such as patch queue 110.
- Extract the patches from the patch queue, one at a time, in a first-in first-out order, for integration into the working build.
- Integrate each patch into the working build ("build the patch"), resulting in an updated working build that comprises the integrated patch. In the present example, the integration function of build server 103 is performed by a patch builder-integrator 112.
- Store the updated working build to a storage device, e.g., 104.
- Back up and protect the working build, e.g., generate secondary copies, instruct another component to generate secondary copies, store the secondary copies to appropriate storage devices, etc.
- Prepare an official release from a working build, e.g., version 1.1 or service pack 1.1.2, etc.
- Communicate with and/or respond to other components of development environment 100 (not shown here), e.g., a storage manager, another storage device, etc.

Storage device 104 may be a high-capacity mass storage device that is well known in the art, such as a storage array. Storage device 104 stores working build 114 and may additionally store any number of versions of working build 114 (not shown). Version management may be performed by build server 103, and is well known in the art.

Patch queue 110 is an illustrative data structure, maintained by build server 103, which data structure comprises any number of submitted patches that are awaiting integration into working build 114. Patch queue 110 may be maintained in a local memory in build server 103, such as in a cache, or may be physically stored in a connected storage device, such as storage device 104. Patch queue 110 may comprise pointers to the actual patches which may be large groups of binary files and may be stored elsewhere, e.g., in storage device 104. As illustrated here, patch queue 110 logically collects patches as they arrive from various developer machines 102, in the following illustrative sequence:

First in time, Patch A from developer machine 102-1;
Second in time, Patch B from developer machine 102-2;
Third in time, Patch C from developer machine 102-3;
Fourth in time, Patch D from developer machine 102-*n*; and
Fifth in time, Patch E from developer machine 102-3.

A patch or "software patch" such as Patch A, Patch B, etc., may comprise one or more binary files. Patch queue 110 is not drawn to scale and the size of each submitted patch may vary dramatically from one patch to another. For example, one patch may comprise two files, whereas another one may comprise one hundred files. Each patch may have an identifier that is unique in software development environment 100.

Patch builder-integrator 112 is a functional module that executes on build server 103 and which incorporates patches into working build 114. In the present example, as is typical with prior-art approaches to software integration, the patches are extracted from patch queue 110 in a first-in first-out (or "FIFO" or "first come first serve") scheme. In the present example, once Patch A is integrated and working build 114 is updated, patch builder-integrator 112 extracts and integrates Patch B, then moves on to Patch C, then to Patch D, and finally to Patch E, thus reflecting the chronological time sequence in which these patches were received by build server 103. As shown herein, this FIFO scheme may be disadvantageous in certain scenarios.

Patch builder-integrator 112 is shown here as a unitary module to ease the reader's understanding of the present disclosure. Patch builder-integrator 112 may be a collection of separate and/or interconnected and/or interoperating modules that perform one or more of the enumerated functions, e.g., extracting patches in a FIFO scheme from patch queue 110; integrating each patch into an existing working build 114; storing the updated working build 114 comprising the integrated patch to storage device 104, etc.

Working build 114, which is stored in storage device 104, is well known in the art and may comprise any appropriate number and size of binary files, which collectively form a set of executable software files. Thus, the set of executable software files logically form—working build 114. These constituent files may be stored in any manner well known in the art in a suitable storage device, such as a storage array. Working build 114 may execute on any suitable target computing device, e.g., Windows-based, Unix-based, etc. Working build 114 changes after every patch is integrated thereinto (or "built"). Therefore, several versions of working build 114 may be maintained by build server 103, e.g., full backups, incrementals, etc. These mechanisms are all well known in the art. The working build may eventually close to new patches and the set of executable software files in the build may be distributed to customers as a new official release or service pack, e.g., version 1.1, version 1.1.2, etc.

Logical communication pathways 132 and 131 (e.g., 131-1, . . . , 131-*n*) may be supported by any suitable underlying physical electronic communications infrastructure that is well known in the art. For example, logical communication pathways 131 and 132 may include one or more networks or other connection types including one or more of the following: the Internet, a wide area network (WAN), a local area network (LAN), a Small Computer System Interface (SCSI) connection, a Fibre Channel connection, a virtual private network (VPN), and/or other appropriate computer or telecommunications networks, combinations of the same or the like.

Integrating a patch may take from a few minutes to an hour or more, depending on the complexity of the submitted patch. The present figure illustrates only a handful of patches awaiting integration in patch queue 110. However, the number of development machines 102 may well reach into the hundreds and may be scattered around the world. In some scenarios, the FIFO approach to extracting and integrating patches may slow down the overall integration process and result in the working build not being available for downstream operations, such as deliveries to system test and responding to customer escalations. Developer time may be wasted while waiting for integration to complete. Thus, FIFO integration may work against business objectives. It would be desirable, therefore, to operate with a more scalable and flexible scheme.

SUMMARY OF THE INVENTION

The present inventor devised an enhanced integration scheme that fully services all submitted patches, yet scales better to larger development environments than the simple FIFO approach of the prior art. Moreover, the illustrative system for managing a software patch submission queue is responsive to certain realities of the development environment and to business priorities as well. Accordingly, queued patches are analyzed to determine which patch should be integrated next into the working build. The chosen patch might not be next in chronological order of arrival at the queue.

Instead, the illustrative build server applies a number of priority factors to every patch awaiting integration in the patch queue, specifically by analyzing one or more relevant patch attributes. Relative to the FIFO default order, a given patch may receive a boost in priority or, conversely, may have its priority reduced by the application of priority factors. The patch that receives the highest priority score in the present evaluation round is then extracted for integration. After the patch has been integrated, the build server (e.g., using an illustrative patch queue manager module) circles back and again evaluates all the patches in the queue, which may have received new patches while the previous patch was being integrated. The queued patches and their respective attributes are again analyzed against the priority factors and once again one patch earns a highest priority score and is accordingly extracted from the patch queue and integrated. This process of determining anew, before each integration cycle, which queued patch earns the highest priority score makes the present scheme flexible and responsive to changing conditions. The process may continue indefinitely as patches are submitted by developers around the clock from any number of locations around the globe.

Example applications of priority factors include one or more of the following considerations:

- A patch that fixes a partially failed earlier patch may receive a boost in priority so that the developer's wait in queue may be shortened. Since a portion of the patch was successfully integrated in an earlier attempt, e.g., 18 files were integrated successfully but two failed, it is important to complete the integration of all the files so that the patch is fully incorporated into the working build and the functionality it comprises is fully available.
- A patch that has already been fully tested, e.g., at a customer Beta site using an informal release, may receive a boost in priority on the grounds that the change has been adequately vetted already. Accordingly, a vetted patch may be incorporated into the working build sooner than another ordinary patch submission.
- A patch that belongs to a fast-track feature may receive a boost in priority. For example, a certain software release may be particularly directed at fixing some key bug or delivering an important new feature set, which may be designated fast-track. A release manager or a product manager may decide what features to designate fast-track in the illustrative system. Accordingly, patches that are associated with the fast-track feature will receive priority boosts, because they represent preferred content for the working build as compared to other incoming patches. For example, virtual machine support may be designated a fast-track feature, and any patch that relates to virtual machine support may be accorded a higher priority than other patches.
- A patch that is "starved" may receive a boost in priority. A patch may be considered to be starved when it has missed the opportunity to be integrated for too long, e.g., for too many integration cycles, too much time, etc. It is conceivable that certain patches will fail to receive the highest priority score after numerous rounds of evaluation and corresponding integration cycles. To foreclose the possibility that a patch may never become top priority and reach the head of the queue, timing criteria are implemented that address the time lag experienced by any given patch. Accordingly, a laggard patch will receive a priority boost or a top priority score after a certain amount of time in queue or based on other relevant timing considerations such as the date/time of patch submission. An alternative criterion may be the number of integration cycles, so that a patch that has missed a predefined number of integration cycles, e.g., 50, may receive a priority boost to the head of the queue.
- A patch may receive a boost in priority based on the location of the developer who submitted the patch. For example, if the developer's location is currently in business hours, it may be advantageous to choose the patch for integration, so that if the integration attempt fails the developer is available to work on a fix during business hours. During certain business hours, only patches from a certain geography may be selected for integration, while other patches may wait. In some scenarios, a team at a certain location may be working on a high priority bugfix or feature set and therefore all patches submitted from that location, no matter the time of day, may be integrated before other locations' patches. Conversely, some locations may receive priority reductions when they fail to meet the business hours or business need criteria.
- A patch may receive a priority reduction when it depends from code in another patch which has yet to be integrated. When software code is highly interdependent, such as when several developers collaborate in developing respective patches, it may be necessary for a certain patch to be integrated ahead of other patches. Accordingly, the dependent patch(es) may receive a priority reduction until the antecedent patch is successfully integrated. Once the antecedent patch is integrated into the working build, the dependent patch(es) may receive a priority boost to make up for the lost time in queue awaiting the integration of the antecedent patch.
- A patch may receive a priority reduction when the submission missed a deadline for the present release. For example, a service pack that has a given availability date may have a submission deadline of three weeks prior, and feature patches that miss that deadline may be rejected from the working build altogether or simply queued at the lowest priority.
- A patch may receive a priority reduction when the system is aware that the developer who submitted the patch is unavailable or has other business priorities. For example, a developer may have another patch that is currently lingering in the failed-patch pool and which the developer should address first before the present patch may be integrated. The rationale here is that the developer should address a failed patch within a certain window of time. If the present patch were to fail integration, the developer would end up with two failed patches to address. The present scheme rewards developers who have no patches in the failed patch pool.

A patch may also receive a priority change by intervention from a release manager who may the primary user of the illustrative patch queue management system. A release manager may reject the integration of a patch that earned the highest priority score from the build server. In other words, the release manager may be given veto power over the determinations of the illustrative patch queue manager, but the veto power is optional to the illustrative embodiment. In the absence of ongoing intervention by the release manager and/or after certain configuration parameters have been administered by the release manager, the illustrative system automatically analyzes the queued patches, assigns priority scores thereto, and designates one patch as the next to be integrated into the working build.

The illustrative system may operate for any length of time based on the illustrative priority factors. A release manager may configure and re-configure the system by administering certain operational parameters.

DETAILED DESCRIPTION

Figure 1:
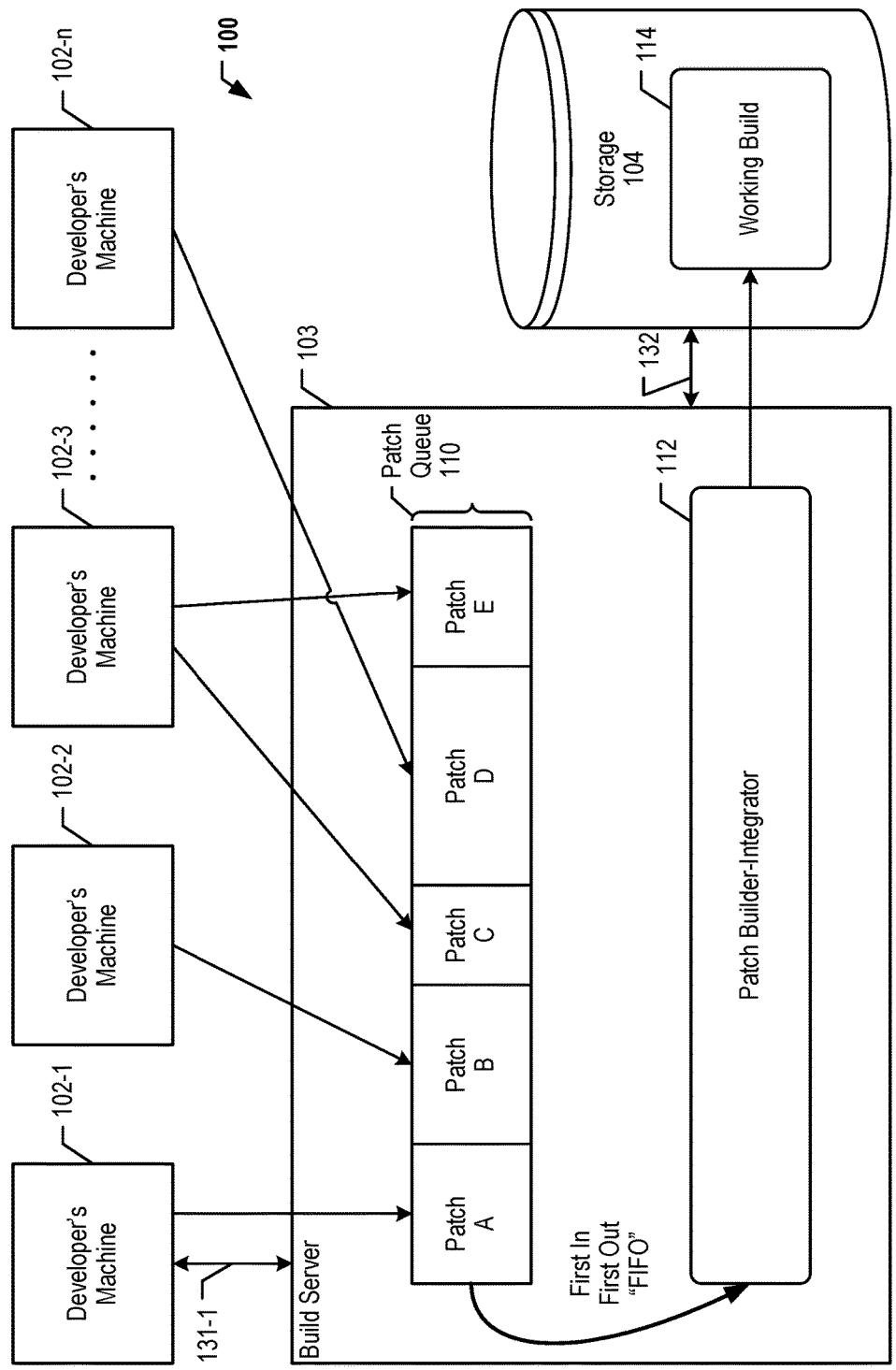
FIG. 1 depicts a prior-art First-In First-Out ("FIFO") approach to managing software submissions in a software development environment 100.
Figure 2:
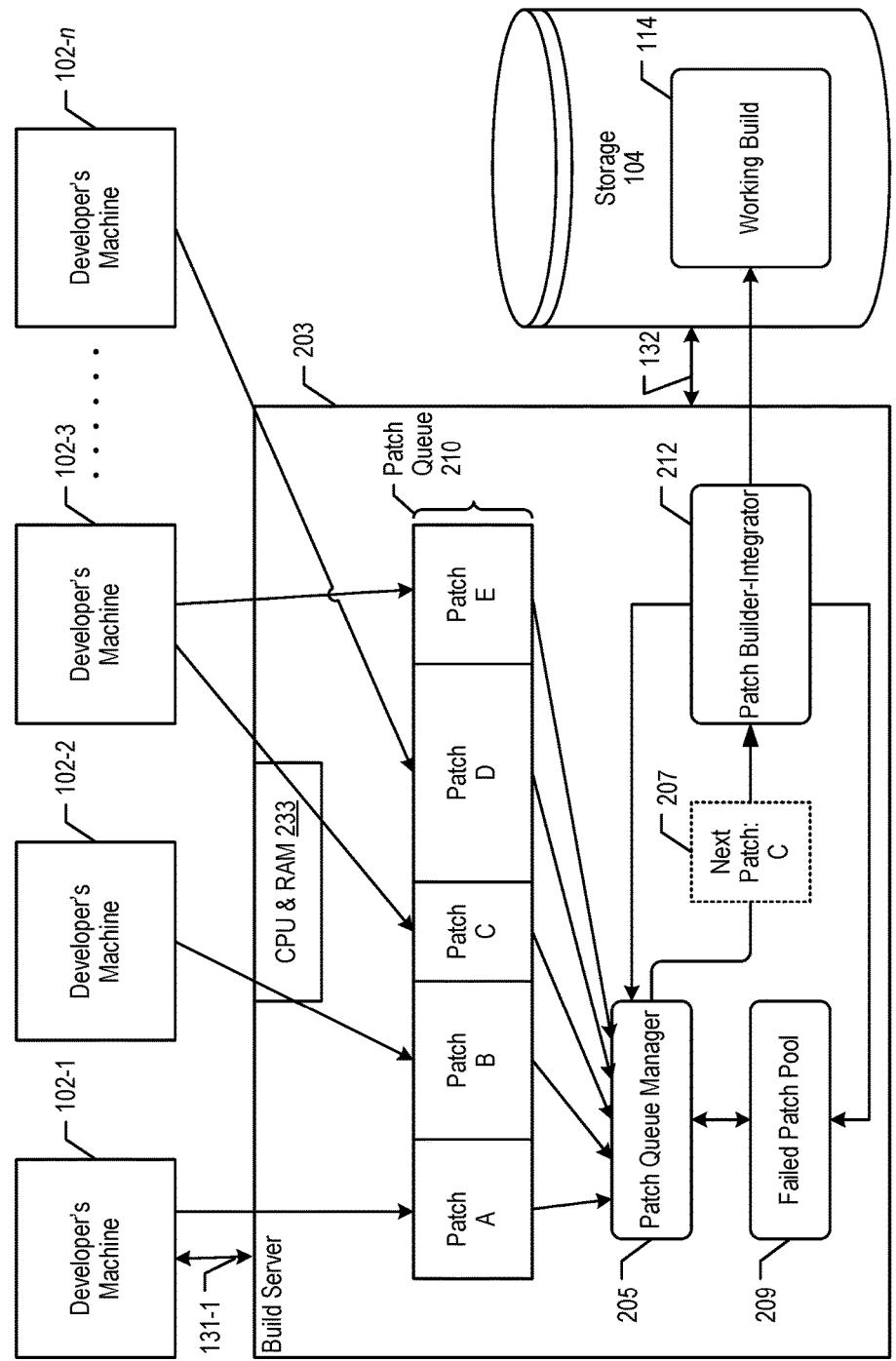
FIG. 2 depicts a system 200 for managing a software patch submission queue according to an illustrative embodiment of the present invention.

FIG. 2 depicts a system 200 for managing a software patch submission queue according to an illustrative embodiment of the present invention. FIG. 2 depicts: developer machines 102-1 through 102-n; build server 203, comprising patch queue 210, patch queue manager 205, "next patch C" 207, failed patch pool 209, and patch builder-integrator 212; and storage device 104 comprising working build 114. The components may be physically interconnected by any suitable communications infrastructure that is well known in the art, such as the logical communication pathways depicted by bi-directional solid arrows 131-1 and 132. The uni-directional solid arrows depict logical data flows within system 200, which may be supported by the underlying communications infrastructure. Components 102, 104, 114, 131, and 132 are described in more detail elsewhere herein.

Build server 203 is a computing device that may be analogous to build server 103 and comprises additional functionality for operating in system 200, including patch queue management logic such as patch queue manager module 205, failed patch pool 209, patch queue 210, etc. See also method 300 and FIGS. 3-5. Build server 203 comprises one or more processors (e.g., a CPU comprising one or more processor units and/or single core or multi core processor(s), etc.) and non transitory computer readable memory (e.g., random access memory (RAM)) for storing executable computer readable instructions such as computer programs/logic and/or applications that may be executed therefrom by the one or more processors (233), and may also comprise additional computer readable memory for mass data storage, e.g., a hard disk, and/or may be associated with and/or have networked access to a mass storage device such as a storage array, e.g., storage device 104.

Patch queue manager 205, is a functional component of build server 203, and may be implemented as executable software and/or firmware, which executes on the underlying build server 203. When it executes according to the illustrative embodiment, patch queue manager 205 may be largely responsible for interoperating with patch queue 210, failed patch pool 209, and patch builder-integrator 212. For example, patch queue manager 205 may analyze each patch in patch queue 210 against priority factors to determine which patch to designate as the next patch for integration based on a priority score; may dispatch the designated next patch to the patch builder-integrator 212 to be integrated into the working build; may query the failed patch pool and/or receive information therefrom; may query the patch builder-integrator 212 and receive information therefrom, etc.

Element 207 illustrates the patch that has been designated to be next for integration and which is accordingly dispatched by patch queue manager 205 to patch builder-integrator 212, illustratively Patch C. The dispatch may be literal, i.e., involving data movement from a patch storage location, or may be figurative, i.e., may be an indication, message, and/or instruction identifying Patch C to patch builder-integrator 212, rather than involving data movement. According to the present example, Patch C is not the next FIFO candidate from patch queue 210. The next FIFO candidate would be Patch A as the earliest patch to arrive at patch queue 210, but according to the illustrative embodiment, build server 203 applied priority factors to the queued patches and chose Patch C to be the next patch for integration, ahead of the earlier Patch A and Patch B. See also FIGS. 3-5.

Failed patch pool 209 is a functional component of build server 203, and may be implemented as executable software and/or firmware, which executes on the underlying build server 203. Failed patch pool 209 may also comprise one or more data structures that track the identities and status of patches that failed integration. When it executes according to the illustrative embodiment, failed patch pool 209 may be largely responsible for interoperating with the illustrative patch queue manager 205 and patch builder-integrator 212. For example, when a submitted patch fails integration, whether in part or in whole, patch builder-integrator 212 may transmit to failed patch pool 209 an identifier of the failed patch, reason(s) for failure, confirmation of any successful operations or partially successful integration, etc. Failed patch pool 209 may store and track the received information and also may notify the respective developer that the patch is now in the failed patch pool and needs to be fixed. Failed patch pool 209 also may respond to queries from or supply information to patch queue manager 205 regarding which patches are in the failed patch pool; this information may be relevant to applying certain priority factors to patches in patch queue 210. For example, a developer who has a patch in the failed patch pool and submits a second distinct patch to patch queue 210 may find that the second patch receives a priority reduction so long as the earlier failed patch remains unaddressed in the failed patch pool 209. See also FIG. 5.

Patch queue 210 may be structured/stored largely like patch queue 110, receiving patch submissions from developer machines 102. Patch queue 210 may comprise a logical ordering of patch identifiers (e.g., pointers to storage locations of the submitted patches) and timestamps when they were received by build server 203. Patch queue 210 as illustrated here shows the queued patches in the order in which they arrived at the queue, i.e., Patch A followed by Patch B followed by Patch C followed by Patch D and followed by Patch E. However, according to the illustrative embodiment, the queued patches in patch queue 210 are not extracted from the queue in FIFO order, i.e., in order of arrival at the queue, and instead are processed based on applying priority factors. Accordingly, patch queue 210 need not keep the patches (or patch identifiers) in FIFO order, though a FIFO order may be used as a convenient default ordering. Since all the patches are analyzed for every integration cycle, and only one patch is chosen as the next to be extracted and integrated, the ordering of the remaining patches in FIFO order may be a convenience and a useful default that minimizes queue processing and re ordering. Patch queue 210 also may comprise additional attributes for each queued patch, which may have been added after the patch is submitted, such as a priority score earned in a preceding evaluation and/or a relationship/dependency attribute relative to other patches. Patch queue 210 may comprise other data structures (not shown), e.g., relational tables comprising attributes of the queued patches.

Patch builder-integrator 212 is analogous to patch builder-integrator 112 and further comprises additional functionality for operating in system 200, e.g., communication with patch queue manager 205, communicating with failed patch pool 209, and receiving patches and/or instructions to integrate from patch queue manager 205 in an order that may differ from the FIFO order of arrival at patch queue 210.

Patch queue manager 205, failed patch pool 209, and patch builder-integrator 212 are shown herein as distinct components to ease understanding of the present disclosure, however, alternative embodiments are also possible within the scope of the present invention. One or more of these functional modules may be embodied as a unified module within build server 203, may be combined into a unified module, may be layered on existing build server code, or may be a logical construct whose functionality is distributed through one or more other functional modules of build server 203, and in any combination thereof. For example, in some embodiments, patch queue manager 205, failed patch pool 209, and patch builder-integrator 212 may be implemented as a unified functional component executing on build server 203. In some alternative embodiments, one or more of these functional modules may execute on another computing component that is physically distinct from build server 203, such as on a dedicated server that operates in conjunction with build server 203, but which may or may not be a logical component of build server 203.

Figure 3:
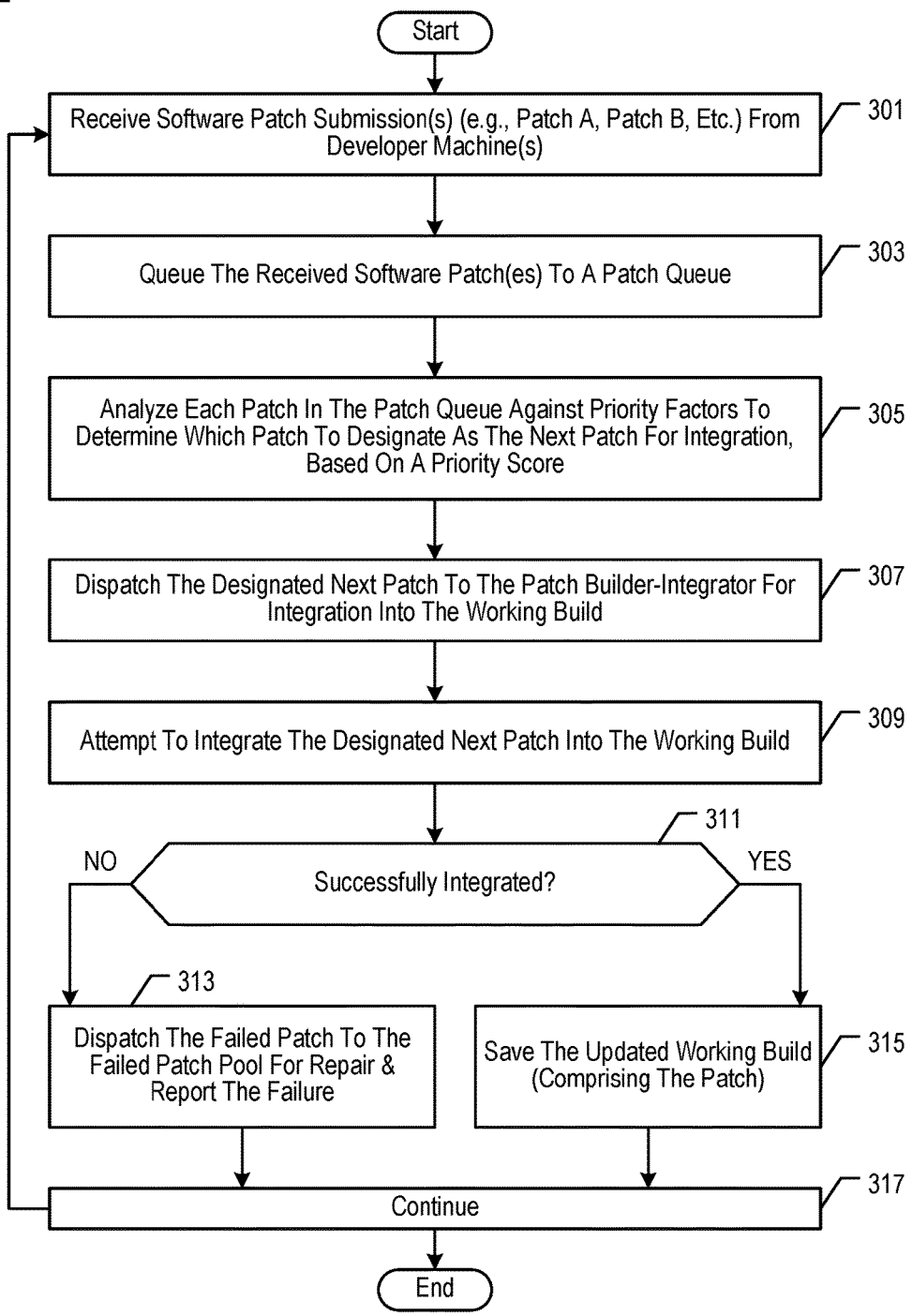
FIG. 3 depicts some salient operations of a method 300 according to an illustrative embodiment of the present invention.

FIG. 3 depicts some salient operations of a method 300 according to an illustrative embodiment of the present invention. Method 300 may be performed by build server 203 according to the illustrative embodiment.

At block 301, build server 203 may receive software patch submission(s) (e.g., patch A, Patch B, etc.) from developer machine(s) 102. As noted, there is no limit to the number of patches that may be received and the geographical locations where they may originate. The submissions may comprise the actual patch data, e.g., transmitted from development machines 102; and/or may comprise patch identifiers and/or pointers to patch storage locations; and/or may also comprise patch attributes.

At block 303, build server 203 may queue the received software patch(es) to a queue such as patch queue 210. Patch queue 210 may comprise a logical ordering of patch identifiers (e.g., pointers to storage locations of the patches) and timestamps of the time when they were received by build server 203. The patches themselves may be stored elsewhere, e.g., in storage device 104 or in another storage device or workspace server (not shown).

At block 305, build server 203 may analyze each patch in the patch queue against priority factors to determine which patch to designate as the next patch for integration, based on a respective priority score. Illustratively, block 305 may be performed by patch queue manager 205. This evaluation operation is described in more detail in subsequent figures. Notably, according to the illustrative embodiment, the patches in the queue undergo the present evaluation anew before each integration, so that an appropriate patch may be selected from the queue. In some alternative embodiments, a hysteresis process may retain the priority scores earned by each patch and use the retained priority scores in the next round of evaluations, so that, for example, a patch that came close to the top in an earlier round may retain its lead and earn top score based in part on how it scored in a previous round. The outcome of block 305 is that a particular patch that is queued in patch queue 210 is designated "next" for integration based on achieving the highest priority score.

At block 307, build server 203 may dispatch the designated next patch, e.g., Patch C in FIG. 2, to patch builder-integrator 212, for integration into the working build 114. Illustratively, block 307 may be performed by patch queue manager 205. The dispatch may be a logical operation in which patch queue manager 205 may logically remove the designated patch (or the unique identifier thereof) from patch queue 210, and may instruct patch builder-integrator 212 to integrate the designated patch. The patch itself may not need to be transferred or moved by patch queue manager 205, and instead it may be obtained by patch builder-integrator 212 from its respective storage location according the patch's unique identifier and/or location pointer.

At block 309, build server 203 may attempt to integrate the designated next patch into the working build 114. Illustratively, block 309 may be performed by patch builder-integrator 212. Patch integration into a working build is well known in the art.

At block 311, method 300 continues based on the outcome of the integration attempt in the preceding block. If the integration succeeds, method 300 continues at block 315. If the integration fails in whole or in part, method 300 continues at block 313.

At block 313, build server 203 may dispatch the failed patch to failed patch pool 209 for repair and may also report the failure, e.g., to patch queue manager 205, to the developer, etc. Illustratively block 313 may be performed by patch builder-integrator 212. As with block 307, the dispatch may be a logical operation in which the failed patch is identified but not actually moved or transferred among components. Control passes to block 317.

At block 315, which may occur after the designated patch is successfully integrated into the working build, the updated working build now comprising the integrated patch and its functionality is stored to an appropriate location, e.g., working build 114 in storage device 104. As noted earlier, distinct versions of working build 114 may be maintained as the patches are incrementally integrated, e.g., by patch-builder integrator 212 according to techniques well known in the art. The successful integration may be reported to other components such as patch queue manager 205 and/or to the submitting developer machine 102 and/or to a release manager.

At block 317, which follows block 313 and block 315, the present process may continue by returning control to block 301 so that more patches may be received by build server 203.

Figure 4:
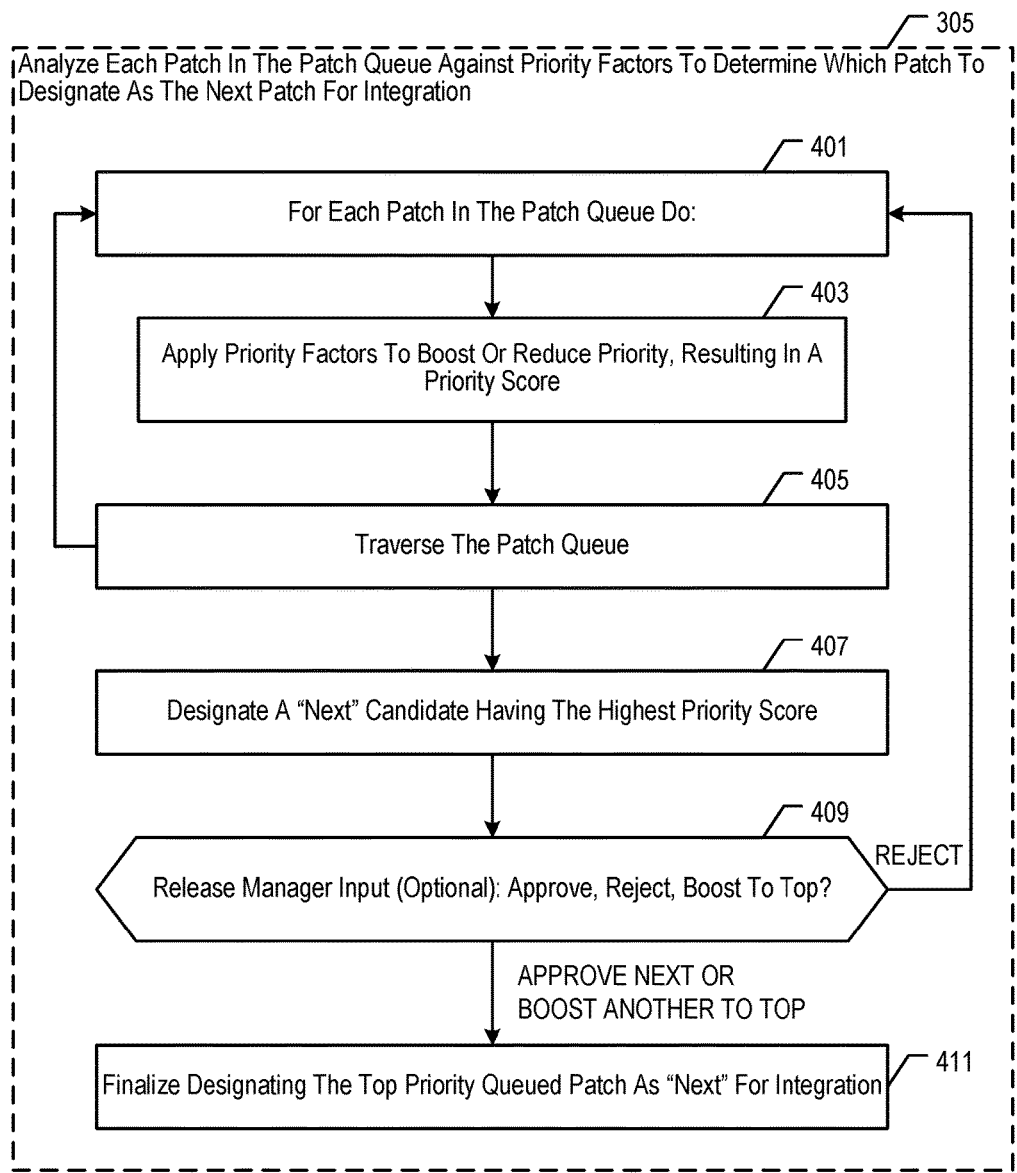
FIG. 4 depicts some salient sub-operations of block 305 in method 300.

FIG. 4 depicts some salient sub-operations of block 305 in method 300. Illustratively, block 305 is directed at analyzing each patch in patch queue 210 against priority factors to determine which patch to designate as the next patch for integration. Illustratively, block 305 may be performed by patch queue manager 205 executing on build server 203.

At block 401, an operational loop is started in reference to patch queue 210, so that each patch therein may be evaluated in turn. The operational loop may illustratively comprise blocks 403 and 405 so that the entire patch queue 210 may be traversed. The order in which the queued patches are evaluated here is not relevant to the illustrative embodiment.

At block 403, build server 203, e.g., using patch queue manager 205, may apply priority factors to boost or reduce the priority of the current patch, resulting in a priority score for each respective patch. Accordingly, the priority score may be based on an initial default value using the time of arrival of the patch at queue 210 and further based on one or more priority factors. Any given priority factor may raise or lower or leave unchanged the patch's priority score from the initial default value, based on attributes of the respective patch. Thus, the patch's priority may be boosted or reduced relative to the patch's default FIFO logical position in patch queue 210. According to the illustrative embodiment, the default or tie breaker is to give top priority to the patch that arrived at the queue first, i.e., the FIFO order. Thus, the purpose of block 403 is to apply a number of priority factors to determine whether another patch in the queue earns a higher priority score and advances to the figurative head of the queue as the next candidate for integration. This block is described in further detail in a subsequent figure.

At block 405, control passes back to block 401 so that the entire patch queue 210 may be traversed; when the patch queue 210 has been traversed in its entirety and a priority score has been assigned to each queued patch, control may pass to block 407.

At block 407, the queued patch that has scored the highest priority score in the present queue 210 may be designated a candidate to be next in line for integration. For example, Patch C may be the highest scoring patch in patch queue 210.

At block 409, which is an optional operation, the release manager may be provided an opportunity to have input as to the next candidate patch. Accordingly, the release manager may approve or reject the next candidate or, alternatively, may choose another queued patch and boost its priority so that it becomes the next patch for integration. If the release manager rejects the next candidate provided by build server 203, control may return to block 401 to once again evaluate patch queue 210 and choose another candidate patch. In such a case, the patch with the second highest priority score may emerge as the next candidate without a complete re-execution of blocks 401 through 405. If the release manager approves the next candidate or chooses another patch and designates it the next patch for integration, control passes to block 411. A user interface may be provided by build server 203 for interfacing with the release manager. In some embodiments, the release manager may be given selective control over the next candidate such as only on those occasions when the candidate patch has certain attributes of interest, e.g., when the next candidate is a very large patch that may take more than an hour to integrate.

At block 411, build server 203 may finalize designating the top priority queued patch as "Next" for integration. According to the example depicted in FIG. 2, Patch C is the designated next patch for integration.

Figure 5:
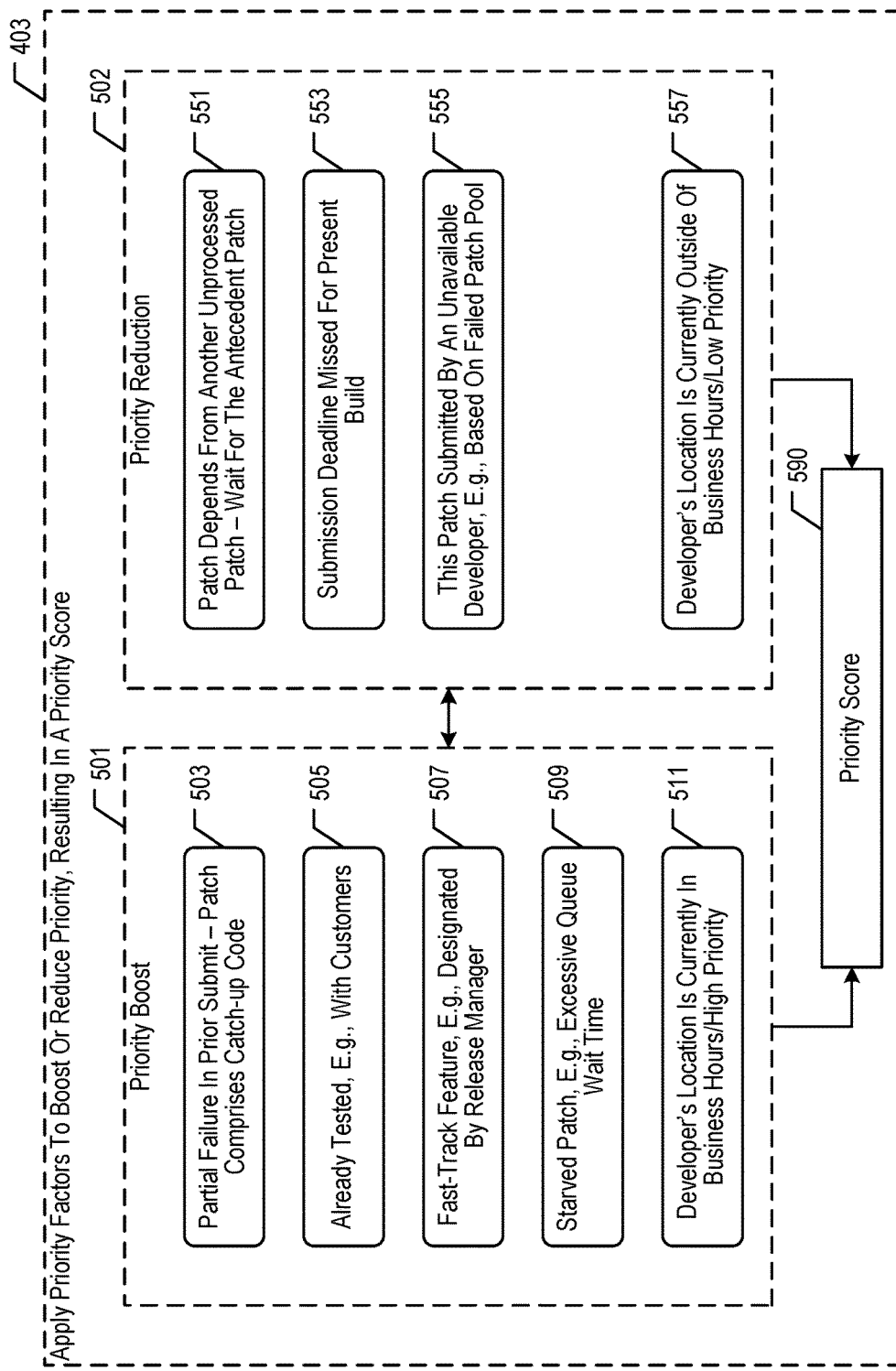
FIG. 5 depicts some salient sub-operations of block 403 in block 305 in method 300.

FIG. 5 depicts some salient sub-operations of block 403 in block 305 in method 300. Block 403 is generally directed to applying priority factors to boost or reduce the priority of a patch under consideration, resulting in a priority score for the given patch. Illustratively, block 403 is performed by patch queue manager 205. Block 403 comprises a number of priority factors, which are illustratively classified as boost factors 501 and reduction factors 502. Applying these factors to the queued patch under consideration will result in a priority score for the queued patch. The priority factors are applied based on certain attributes of each patch. Boost factors 501 tend to increase the priority score assigned to the patch, while reduction factors 502 tend to decrease the priority score assigned to the patch. The priority score may be retained for the next round, e.g., in case the release manager rejects a next candidate and the second highest priority score becomes relevant. The priority factors may be applied in any order, without limitation. The queued patch under consideration may start out with an initial score that reflects its order of arrival at the queue, e.g., based on a timestamp, such that the earliest patch to arrive in the present queue may have the highest priority score by default, before priority factors 501 and 502 are applied.

Factor 503, which may be classified as a boost factor, may apply to a patch that fixes a partially failed earlier patch. Factor 503 may boost the patch's priority so that the developer's wait in queue may be shortened. Since a portion of the patch was successfully integrated in an earlier attempt, e.g., 18 of 20 files were integrated successfully but two failed, it is important to complete the integration of all the files so that the patch is fully incorporated into the working build. In some embodiments, factor 503 or another analogous factor may be applied to dependent patches that previously received priority reductions while waiting for an antecedent patch to be integrated (see, e.g., factor 551). Once the antecedent patch is successfully integrated into the working build, the dependent patch(es) may receive a priority boost, e.g., via factor 503, to make up for the lost time in queue awaiting the integration of the antecedent patch.

Factor 505, which may be classified as a boost factor, may apply to a patch that has already been fully tested, e.g., at a customer Beta site using an informal release. This attribute may be populated by the developer when submitting the patch for integration and/or by a release manager and/or by a source control system and/or other utility involved in generating the submitted patch. Factor 505 may boost the patch's priority on the grounds that the patch has been adequately vetted already. Accordingly, a vetted patch may be incorporated into the working build sooner than another ordinary submission.

Factor 507, which may be classified as a boost factor, may apply to a patch that belongs to a fast-track feature. Accordingly, factor 507 may boost the patch's priority. For example, a certain software release may be particularly directed at fixing some key bug or delivering an important new feature set, which may be designated fast-track by a release manager or a product manager. Accordingly, patches that are associated with the fast-track feature will receive priority boosts, via factor 507, because they represent preferred content for the working build as compared to other incoming patches. The attribute associating the patch with the fast-track feature may be populated by the developer and/or a release manager and/or by a source control tool and/or by another submission utility at the time that the patch is submitted for integration.

Factor 509, which may be classified as a boost factor, may apply to a patch that is determined to be "starved." Accordingly, factor 509 may boost the starved patch's priority and may assign it to the head of the queue. A patch may be considered to be starved when it has missed the opportunity to be integrated for too long, e.g., for too many integration cycles, for too much elapsed time, etc. Illustratively, patch queue manager 205 may make this determination when analyzing the patch. It is conceivable that certain patches will fail to receive the highest priority score after numerous rounds of evaluation and corresponding integration cycles. To foreclose the possibility that a patch may never reach the head of the queue, timing criteria and/or counters may be implemented that address the time lag experienced by any given patch. Accordingly, a laggard patch will receive a priority boost, via factor 509, after a certain amount of time in queue and/or based on other relevant timing considerations, e.g., the date/time of patch submission. An alternative criterion may be the number of integration cycles, so that a patch that has missed a predefined number of integration cycles, e.g., 50, may receive a priority boost to the head of the queue via factor 509.

Factor 511, which may be classified as a boost factor, may apply to a patch based on the geographic location of the developer who submitted the patch, e.g., using the geographic location/region/identifier of the developer's machine 102. Accordingly, factor 511 may boost the patch's priority if the developer/developer's machine 102 is based in a favored location. For example, if the developer's location is currently in business hours, it may be advantageous to choose the patch for integration, so that if the integration attempt fails the developer is available to work on a fix during business hours. During certain business hours, only patches from a certain geography may be selected for integration, while other patches may wait. In some scenarios, a team at a certain location may be working on a high priority bugfix or feature set and therefore all patches submitted from that location, no matter the time of day, may be integrated before other locations' patches. Conversely, some geographical locations may receive priority reductions, e.g., via factor 557, when they fail to meet the business hours or business need criteria.

Factor 551, which may be classified as a reduction factor, may apply to a patch that depends from code in another patch which has yet to be integrated. Accordingly, factor 551 may reduce the patch's priority. When software code is highly interdependent, such as when several developers collaborate in developing respective patches, it may be necessary for a certain patch to be integrated ahead of other patches. Accordingly, the dependent patch(es) may receive a priority reduction, via factor 551, until the antecedent patch is successfully integrated. Dependency attributes may be populated by the developer or by a source control tool or by another submission utility at the time that the patch is submitted for integration; alternatively, patch queue manager 205 may deduce dependencies when analyzing queued patches and may populate respective attribute(s) accordingly. Once the antecedent patch is successfully integrated into the working build, the dependent patch(es) may receive a priority boost to make up for the lost time in queue awaiting the integration of the antecedent patch (see, e.g., factor 503).

Factor 553, which may be classified as a reduction factor, may apply to a patch that missed a submission deadline for the present release. Accordingly, factor 553 may reduce the patch's priority; the patch may be entirely rejected from integration to the present working build and may be dispatched to the failed patch pool 509 without any attempt at integration. For example, a service pack that has a given availability date may have a submission deadline of three weeks prior, and feature code that misses that deadline may be rejected altogether or simply queued at the lowest priority. The attribute that identifies the patch content and associates it with a particular build may be populated by the developer or by a source control tool or by another submission utility at the time that the patch is submitted for integration.

Factor 555, which may be classified as a reduction factor, may apply to a patch whose developer is unavailable or has other business priorities. Accordingly, factor 555 may reduce the patch's priority. For example, a developer may have another patch that is currently lingering in the failed patch pool 509 and, as a matter of policy, the developer should address the failed patch before the present patch may be integrated. The rationale here is that the developer should address a failed patch within a certain window of time before submitting other code. If the present patch were to fail integration, the developer would have two failed patches to address. Developer unavailability may be detected by the illustrative patch queue manager 205 in other ways too, such as by accessing the developer's vacation calendar or accessing a vacation scheduling system (not shown).

Factor 557, which may be classified as a reduction factor, may be considered the converse of factor 511, and may apply to a patch based on the geographic location of the developer who submitted the patch, e.g., using the geographic location/region/identifier of the developer's machine 102. Accordingly, factor 557 may reduce the patch's priority if the developer is based in a disfavored location. For example, if the developer's location is currently outside of business hours, it may be disadvantageous to choose this patch for integration; if the integration of the present patch were to fail, the developer may not be around to fix it. During certain business hours, only patches from a certain geography may be selected for integration, while other patches may wait, e.g., via factor 557 reducing their respective priority.

Although not shown in the present figure, a patch may also receive a priority boost or reduction by intervention from a release manager who may be the primary user of the illustrative patch queue management system. See also block 409 in an earlier figure. A release manager may reject the integration of a given patch that build server 203 has designated the next patch based on assigning it the highest priority score. In other words, the release manager may have veto power over the determinations of the illustrative patch queue manager 205, but the veto power is optional to the illustrative embodiment. In the absence of ongoing intervention by the release manager and/or after certain configuration parameters have been administered by the release manager, the illustrative system automatically analyzes the queued patches, assigns priority scores thereto based on relevant patch attributes, and designates one patch as the next patch to be integrated into the working build.

After all the operational priority factors have been applied, a priority score for the present patch results at block 590. The priority factors described herein are not exclusive and other priority boost and/or reduction factors may be implemented within the scope of the present invention. Moreover, some alternative embodiments may implement only some but not all of the depicted priority factors 501 and 502 and/or combinations of the recited factors. The scale, quantitative values, and relative changes resulting from applying the priority factors will vary based on the particular implementation of the illustrative system as well as based on the relative importance assigned to certain priority factors, e.g., by the release manager. In some embodiments, the release manager may assign relative weights to some or all the priority factors, such that some priority factors will be more influential towards the final priority score. In some embodiments, all the priority factors may be equally weighted. In the preferred embodiment, the illustrative priority factors are equally weighted and respectively raise or lower the priority score from the initial default value in equal increments. Block 403 may end after the priority score for the present patch under consideration is generated and assigned to the patch.

In regard to the components, blocks, operations and/or sub-operations described in reference to FIGS. 2-5, other embodiments are possible within the scope of the present invention, such that the above-recited components, priority factors, attributes, steps, blocks, operations, sub-operations and/or messages/requests/queries/instructions may be differently arranged, sequenced, sub-divided, organized, and/or combined. In some embodiments, a different component may initiate or execute a given operation. Priority factors and patch attributes may be differently arranged, combined, and/or applied.

Example Embodiments

Some example embodiments of the present invention are recited in this section in the form of methods, systems, and tangible non-transitory computer-readable media, without limitation.

According to an illustrative embodiment of the present invention, a computer-implemented method for managing a software patch submission queue for integration into a working build, may comprise: integrating a plurality of software patches in a submission queue into the working build, in an order that differs from the chronological order in which the plurality of software patches arrived at the submission queue; and wherein the order of integration is based on applying one or more priority factors to each software patch in the submission queue according to respective patch attributes.

According to another illustrative embodiment of the present invention, a system for managing a software patch submission queue may operate according to the computer-implemented method recited in the preceding paragraph. According to an illustrative embodiment of the present invention, a tangible non-transitory computer-readable medium may comprise computer-readable instructions, which, when executed by a computing device having at least one processor and non-transitory computer memory, cause the computing device to perform the method recited in the paragraph above.

According to another example embodiment of the present invention, a computer-implemented method for managing a software patch submission queue for integration into a working build, may comprise: integrating a plurality of software patches in a submission queue into the working build, in an order that differs from the chronological order in which the plurality of software patches arrived at the submission queue; wherein the order of integration is based on applying one or more priority factors to each respective software patch in the submission queue wherein the one or more priority factors are based on attributes of the respective patch, which may raise or lower the placement of the respective patch in the order relative to other patches in the submission queue.

According to another example embodiment of the present invention, a system for managing a software patch submission queue may operate according to the computer-implemented method recited in the preceding paragraph. Likewise, a tangible non-transitory computer-readable medium may comprise computer-readable instructions, which, when executed by a computing device having at least one processor and non-transitory computer memory, cause the computing device to perform the method recited in the paragraph above.

According to an illustrative embodiment of the present invention, a computer-implemented method may comprise: receiving, by a first computing device comprising at least one processor and non-transitory computer memory, a plurality of submissions of software patches from one or more second computing devices, each respective second computing device also comprising at least one processor and non-transitory computer memory, wherein each software patch comprises one or more executable software files and is submitted for integration into a first set of executable software files that collectively defines a working build, wherein the first computing device is designated a build server, and wherein the second computing devices are designated developer machines; queueing, by the build server, the plurality of submitted software patches into a queue; analyzing, by the build server, each software patch in the queue, wherein the analyzing comprises assigning a respective priority score to each software patch in the queue, wherein each respective priority score is based on: a default value assigned to the respective priority score based on the time that the respective software patch arrived at the queue; and at least one priority factor that changes the respective priority score based on one or more attributes of the respective software patch; selecting, by the build server, a first patch from the queue as the next patch to be integrated into the working build, wherein first patch has the highest priority score among the software patches in the queue, and wherein the first patch is not the earliest software patch to arrive at the queue; removing the first software patch from the queue, resulting in a first updated queue; and integrating the first patch into the working build.

According to another illustrative embodiment of the present invention, a computer-implemented method comprising executing on a first computing device comprising at least one processor and non-transitory computer memory the steps of: receiving, by the first computing device, a plurality of submissions of software patches from one or more second computing devices, wherein each software patch comprises one or more executable software files and is submitted for integration into a first set of executable software files that collectively defines a working build; queueing, by the first computing device, the plurality of submitted software patches into a queue; assigning, by the first computing device, to each software patch in the queue, a respective priority score based on: (i) a default value based on the time that the respective software patch arrived at the queue; and (ii) at least one priority factor that may change the respective default value based on one or more attributes of the respective software patch; selecting, by the first computing device, a first patch from the queue as the next patch to be integrated into the working build, wherein first patch has the highest priority score among the software patches in the queue, and wherein the first patch is not the earliest software patch to arrive at the queue; removing the first software patch from the queue, resulting in a first updated queue; and integrating the first patch into the working build, resulting in an updated working build that comprises the functionality of the first patch.

The above-recited method wherein at least one of the attributes of the first software patch indicates the functional content of the software patch. The above-recited method wherein at least one of the attributes of the first software patch associates the respective software patch with another software patch also in the queue. The above-recited method wherein at least one of the attributes of the first software patch indicates a dependency between the respective software patch and another software patch currently or previously in the queue. The above-recited method wherein at least one of the attributes of the first software patch indicates a geographical location from which the first software patch was submitted. The above-recited method wherein at least one of the attributes of the first software patch associates the first software patch with a preferred feature.

The above-recited method wherein the at least one priority factor raises the priority score of a given software patch whose one or more attributes indicate that the given software patch fixes a problem with an earlier software patch which partially failed integration into the working build. The above-recited method wherein the at least one priority factor raises the priority score of a given software patch whose one or more attributes indicate that the given software patch depends from an antecedent software patch that has been successfully integrated into the working build. The above-recited method wherein the at least one priority factor raises the priority score of a given software patch whose one or more attributes indicate that the given software patch depends from an antecedent software patch that has been successfully integrated into the working build, and also indicate that the given software patch previously had its priority score lowered before the antecedent software patch had been integrated into the working build. The above-recited method wherein the at least one priority factor raises the priority score of a given software patch whose one or more attributes indicate that the given software patch has been successfully tested with one or more customers before being submitted to the queue. The above-recited method wherein the at least one priority factor raises the priority score of a given software patch whose one or more attributes indicate that the given software patch has been given a higher importance. The above-recited method wherein the at least one priority factor raises the priority score of a given software patch whose one or more attributes indicate that the given software patch comprises preferred content. The above-recited method wherein the at least one priority factor raises the priority score of a given software patch whose one or more attributes indicate that the given software patch is associated with a functionality that has been given a higher importance. The above-recited method wherein the at least one priority factor raises the priority score of a given software patch that has been in the queue for longer than a predefined period of time. The above-recited method wherein the at least one priority factor raises the priority score of a given software patch that has been in the queue for more than a predefined number of integration cycles. The above-recited method wherein the at least one priority factor raises the priority score of a given software patch based on the geographic location from which it has been submitted. The above-recited method wherein the at least one priority factor raises the priority score of a given software patch based on the geographic location from which it has been submitted and the time of day at the geographic location.

The above-recited method wherein the at least one priority factor lowers the priority score of a given software patch based on the geographic location from which it has been submitted. The above-recited method wherein the at least one priority factor lowers the priority score of a given software patch based on the geographic location from which it has been submitted and the time of day at the geographic location. The above-recited method wherein the at least one priority factor lowers the respective priority score of a given software patch whose one or more attributes indicate that the given patch depends from another patch that has not yet been integrated into the working build. The above-recited method wherein the at least one priority factor lowers the priority score of a given software patch which has been submitted to the queue after a predefined deadline. The above-recited method wherein the at least one priority factor results in removing from the queue a given software patch which has been submitted to the queue after a predefined deadline. The above-recited method wherein the at least one priority factor lowers the priority score of a given software patch submitted by a first developer, wherein another software patch submitted by the same first developer is presently assigned to a failed-patch pool. The above-recited method wherein the at least one priority factor lowers the priority score of a given software patch and wherein a second priority factor increases the priority score of the given software patch.

The above-recited method may further comprise: designating, by the first computing device, a second patch in the first updated queue as the next patch to be integrated into the working build, wherein the second patch has the highest priority score among the plurality of software patches in the first updated queue based on the at least one priority factor. The above-recited method may further comprise: designating, by the first computing device, a second patch in the first updated queue as the next patch to be integrated into the working build, wherein the second patch has the highest priority score among the plurality of software patches in the first updated queue based on the at least one priority factor, and wherein the second patch is not the earliest-arriving software patch among the software patches in the first updated queue.

According to another illustrative embodiment of the present invention, a system for managing a software patch submission queue may operate according to the computer-implemented methods recited in the preceding paragraphs. According to an illustrative embodiment of the present invention, a tangible non-transitory computer-readable medium may comprise computer-readable instructions, which, when executed by a computing device having at least one processor and non-transitory computer memory, such as an illustrative build server, will cause the computing device to perform the methods recited in the paragraphs above.

According to yet another example embodiment, a system for managing software patch submissions for a working build may comprise: a first computing device that comprises at least one processor and non-transitory computer memory; a plurality of second computing devices for generating and submitting one or more respective software patches; a storage device for storing at least one version of the working build generated by the first computing device; wherein the first computing device is programmed to: receive a plurality of submissions of software patches from the one or more second computing devices, wherein each software patch comprises one or more executable software files and is submitted for integration into a first set of executable software files that collectively defines the working build; queue the plurality of submitted software patches into a queue; assign a respective priority score to each software patch in the queue, wherein each respective priority score is based on: (i) a default value based on the time that the respective software patch arrived at the queue; and (ii) at least one priority factor that may change the respective default value based on one or more attributes of the respective software patch; select a first patch from the queue as the next patch to be integrated into the working build, wherein first patch has the highest priority score among the software patches in the queue, and wherein the first patch is not the earliest software patch to arrive at the queue; remove the first software patch from the queue, resulting in a first updated queue; and integrate the first patch into the working build, resulting in an updated working build that comprises the functionality of the first patch.

The above-recited system wherein at least one of the attributes of the first software patch indicates the functional content of the software patch. The above-recited system wherein at least one of the attributes of the first software patch associates the respective software patch with another software patch also in the queue. The above-recited system wherein at least one of the attributes of the first software patch indicates a dependency between the respective software patch and another software patch currently or previously in the queue. The above-recited system wherein at least one of the attributes of the first software patch indicates a geographical location from which the first software patch was submitted. The above-recited system wherein at least one of the attributes of the first software patch associates the first software patch with a preferred feature.

The above-recited system wherein the at least one priority factor raises the priority score of a given software patch whose one or more attributes indicate that the given software patch fixes a problem with an earlier software patch which partially failed integration into the working build. The above-recited system wherein the at least one priority factor raises the priority score of a given software patch whose one or more attributes indicate that the given software patch depends from an antecedent software patch that has been successfully integrated into the working build. The above-recited system wherein the at least one priority factor raises the priority score of a given software patch whose one or more attributes indicate that the given software patch depends from an antecedent software patch that has been successfully integrated into the working build, and also indicate that the given software patch previously had its priority score lowered before the antecedent software patch had been integrated into the working build. The above-recited system wherein the at least one priority factor raises the priority score of a given software patch whose one or more attributes indicate that the given software patch has been successfully tested with one or more customers before being submitted to the queue. The above-recited system wherein the at least one priority factor raises the priority score of a given software patch whose one or more attributes indicate that the given software patch has been given a higher importance. The above-recited system wherein the at least one priority factor raises the priority score of a given software patch whose one or more attributes indicate that the given software patch comprises preferred content. The above-recited system wherein the at least one priority factor raises the priority score of a given software patch whose one or more attributes indicate that the given software patch is associated with a functionality that has been given a higher importance. The above-recited system wherein the at least one priority factor raises the priority score of a given software patch that has been in the queue for longer than a predefined period of time. The above-recited system wherein the at least one priority factor raises the priority score of a given software patch that has been in the queue for more than a predefined number of integration cycles. The above-recited system wherein the at least one priority factor raises the priority score of a given software patch based on the geographic location from which it has been submitted. The above-recited system wherein the at least one priority factor raises the priority score of a given software patch based on the geographic location from which it has been submitted and the time of day at the geographic location.

According to yet another embodiment, a tangible non-transitory computer-readable medium may store instructions, which when executed by a first computing device comprising at least one processor and non-transitory computer memory, may cause the first computing device to perform a method comprising: receiving, by the first computing device, a plurality of submissions of software patches from one or more second computing devices, wherein each software patch comprises one or more executable software files and is submitted for integration into a first set of executable software files that collectively defines a working build; queueing, by the first computing device, the plurality of submitted software patches into a queue; assigning, by the first computing device, to each software patch in the queue, a respective priority score based on: (i) a default value based on the time that the respective software patch arrived at the queue; and (ii) at least one priority factor that may change the respective default value based on one or more attributes of the respective software patch; selecting, by the first computing device, a first patch from the queue as the next patch to be integrated into the working build, wherein first patch has the highest priority score among the software patches in the queue, and wherein the first patch is not the earliest software patch to arrive at the queue; removing the first software patch from the queue, resulting in a first updated queue; and integrating the first patch into the working build, resulting in an updated working build that comprises the functionality of the first patch.

The above-recited tangible non-transitory computer-readable medium wherein the at least one priority factor lowers the priority score of a given software patch based on the geographic location from which it has been submitted. The above-recited tangible non-transitory computer-readable medium wherein the at least one priority factor lowers the priority score of a given software patch based on the geographic location from which it has been submitted and the time of day at the geographic location. The above-recited tangible non-transitory computer-readable medium wherein the at least one priority factor lowers the respective priority score of a given software patch whose one or more attributes indicate that the given patch depends from another patch that has not yet been integrated into the working build. The above-recited tangible non-transitory computer-readable medium wherein the at least one priority factor lowers the priority score of a given software patch which has been submitted to the queue after a predefined deadline. The above-recited tangible non-transitory computer-readable medium wherein the at least one priority factor results in removing from the queue a given software patch which has been submitted to the queue after a predefined deadline. The above-recited tangible non-transitory computer-readable medium wherein the at least one priority factor lowers the priority score of a given software patch submitted by a first developer, wherein another software patch submitted by the same first developer is presently assigned to a failed-patch pool. The above-recited tangible non-transitory computer-readable medium wherein the at least one priority factor lowers the priority score of a given software patch and wherein a second priority factor increases the priority score of the given software patch.

The above-recited tangible non-transitory computer-readable medium wherein the method further comprises: designating, by the first computing device, a second patch in the first updated queue as the next patch to be integrated into the working build, wherein the second patch has the highest priority score among the plurality of software patches in the first updated queue based on the at least one priority factor. The above-recited tangible non-transitory computer-readable medium wherein the method further comprises: designating, by the first computing device, a second patch in the first updated queue as the next patch to be integrated into the working build, wherein the second patch has the highest priority score among the plurality of software patches in the first updated queue based on the at least one priority factor, and wherein the second patch is not the earliest-arriving software patch among the software patches in the first updated queue.

According to another illustrative embodiment, a system for managing a software patch submission queue may comprise: a plurality of computing devices, designated developer machines, for generating and submitting respective software patches; a computing device designated a build server in communication with the plurality of developer machines; and a storage device for storing at least one version of a working build generated by the build server; wherein the build server is configured to: queue a plurality of submitted software patches to a queue, analyze each software patch in the queue based on a plurality of priority factors, resulting in a first priority score assigned to each of the software patches in the queue, select from the queue the software patch with the highest first priority score, wherein the selected software patch is not the earliest software patch to have been submitted to the queue, remove the selected software patch from the queue, integrate the selected software patch into the working build, which is designated the first updated working build, and store the first updated working build to the storage device.

The above-recited system wherein the build server is further configured to: after storing the first updated working build to the storage device, analyze each remaining software patch in the queue based on the plurality of priority factors, resulting in a highest second priority score for one of the remaining software patches in the queue, integrate the software patch with the highest second priority score into the first updated working build, which is designated the second updated working build, and store the second updated working build to the storage device. The above-recited system wherein the build server is configured to analyze each software patch according to at least one attribute thereof which indicates the functional content of the software patch. The above-recited system wherein the build server is configured to analyze each software patch according to at least one attribute thereof which associates the respective software patch with another software patch also identified in the queue. The above-recited system wherein the build server is configured to analyze each software patch according to at least one attribute thereof which indicates a dependency between the respective software patch and another software patch currently or previously identified in the queue. The above-recited system wherein the build server is configured to analyze each software patch according to at least one attribute thereof which indicates a geographical location from which the software patch was submitted. The above-recited system wherein the build server is configured to analyze each software patch according to at least one attribute thereof which associates the respective software patch with a preferred feature.

According to another example embodiment of the present invention, a computer-implemented method for managing a software patch submission queue may operate according to the systems recited in the preceding paragraphs. According to an illustrative embodiment of the present invention, a tangible non-transitory computer-readable medium may comprise computer-readable instructions, which, when executed by a computing device having at least one processor and non-transitory computer memory, such as an illustrative build server, will cause the computing device to perform according to the systems recited in the paragraphs above.

According to another embodiment, a computer-implemented method may perform as generally shown and described herein and equivalents thereof. Likewise, a system as generally shown and described herein and equivalents thereof. Likewise, a tangible non-transitory computer readable medium storing instructions, which when executed by at least one computing device, case the computing device to perform a method as generally shown and described herein and equivalents thereof.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside and execute on servers, workstations, personal computers, computerized tablets, PDAs, and other computing devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computing device or other programmable data processing apparatus to cause a series of operations to be performed on the computing device or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method for managing software patch submissions for integration into a working build, the method comprising executing on a first computing device the steps of:
   receiving for integration into a first set of executable software files that collectively defines a working build, by the first computing device, a plurality of software patches arriving in a chronological order from one or more second computing devices,
       wherein each software patch comprises one or more executable software files;
   queueing, by the first computing device, the plurality of received software patches into a queue;
   assigning, by the first computing device, to each software patch in the queue, a respective priority score based at least in part on whether the respective software patch was submitted by a user who has at least one other software patch assigned to a pool of software patches that previously failed integration,
    wherein the respective priority score of a given software patch is lowered when the given software patch was submitted by a user who has at least one other software patch assigned to the pool of software patches that previously failed integration;
selecting, by the first computing device, in an order that differs from the chronological order in which the plurality of software patches were received by the first computing device, a first software patch having a highest priority score among the software patches in the queue; and
integrating the first software patch into the working build, resulting in an updated working build that comprises a functionality of the first software patch;
wherein the respective priority score assigned to a given software patch in the queue is further based on at least one of:
    (a) a geographical location where the given software patch was submitted for integration into the working build,
    (b) a time of day at a geographical location where the given software patch was submitted for integration into the working build,
    (c) an indication that the given software patch fixes a problem of an earlier software patch that failed integration into the working build,
    (d) an indication that the given software patch previously had its priority score lowered due to a failed dependency on an antecedent software patch, and
    (e) an indication that the given software patch was successfully tested with one or more customers before being submitted for integration into the working build; and
wherein:
    (A) the respective priority score of a given software patch is raised when the geographical location where the given software patch was submitted is below a predefined geographical difference relative to a second geographical location where the working build is integrated, and the respective priority score of the given software patch is lowered when the geographical location where the given software patch was submitted is more than the predefined geographical difference relative to the second geographical location where the working build is integrated,
    (B) the respective priority score of a given software patch is raised when the time of day at the geographical location where the given software patch was submitted is below a predefined time difference relative to a second time of day at a second geographical location where the working build is integrated, and the respective priority score of the given software patch is lowered when the time of day at the first geographical location where the given software patch was submitted is more than the predefined time difference relative to the second time of day at the second geographical location where the working build is integrated,
    (C) the respective priority score of a given software patch in the queue is raised on the indication that the given software patch fixes a problem of an earlier software patch that failed integration into the working build,
    (D) the respective priority score of a given software patch in the queue is raised on the indication that the given software patch previously had its priority score lowered due to a failed dependency on an antecedent software patch and which dependency is currently satisfied, and
    (E) the respective priority score of a given software patch in the queue is raised on the indication that the given software patch was successfully tested with one or more customers before being submitted for integration into the working build.

2. A computer-implemented method for managing software patch submissions for integration into a working build based at least in part on geographical location, the method comprising executing on a first computing device the steps of:
receiving for integration into a first set of executable software files that collectively defines a working build, by the first computing device, a plurality of software patches arriving in a chronological order from one or more second computing devices,
    wherein each software patch comprises one or more executable software files;
queueing, by the first computing device, the plurality of received software patches into a queue;
assigning, by the first computing device, to each software patch in the queue, a respective priority score based at least in part on a geographical location where the respective software patch was submitted,
    wherein the respective priority score of a given software patch is (i) raised when a first geographical location where the given software patch was submitted is below a predefined geographical difference relative to a second geographical location where the working build is integrated, and (ii) lowered when the first geographical location where the given software patch was submitted is more than the predefined geographical difference relative to the second geographical location where the working build is integrated;
selecting, by the first computing device, in an order that differs from the chronological order in which the plurality of software patches were received by the first computing device, a first software patch having a highest priority score among the software patches in the queue; and
integrating the first software patch into the working build, resulting in an updated working build that comprises a functionality of the first software patch.

3. The computer-implemented method of claim 2 wherein the respective priority score assigned to a given software patch in the queue is further based on at least one of:
    (a) a time of day at a geographical location where the given software patch was submitted for integration into the working build,
    (b) an indication that the given software patch fixes a problem of an earlier software patch that failed integration into the working build,
    (c) an indication that the given software patch previously had its priority score lowered due to a failed dependency on an antecedent software patch and which dependency is currently satisfied,
    (d) an indication that the given software patch was successfully tested with one or more customers before being submitted for integration into the working build, and (e) whether the given software patch was submitted by a user who has at least one other software patch assigned to a pool of software patches that previously failed integration.

4. The computer-implemented method of claim 2 wherein before assigning the respective priority score to a given software patch submitted by a user who has at least one other software patch assigned to a pool of software patches that previously failed integration, removing the given software patch from the queue.

5. A computer-implemented method for managing software patch submissions for integration into a working build based at least in part on time of day, the method comprising executing on a first computing device the steps of:
   receiving for integration into a first set of executable software files that collectively defines a working build, by the first computing device, a plurality of software patches arriving in a chronological order from one or more second computing devices,
      wherein each software patch comprises one or more executable software files;
   queueing, by the first computing device, the plurality of received software patches into a queue;
   assigning, by the first computing device, to each software patch in the queue, a respective priority score based at least in part on a time of day at a geographical location where the respective software patch was submitted for integration into the working build,
      wherein the respective priority score of a given software patch is (i) raised when a first time of day at a first geographical location where the given software patch was submitted is below a predefined time difference relative to a second time of day at a second geographical location where the working build is integrated, and (ii) lowered when the first time of day at the first geographical location where the given software patch was submitted is more than the predefined time difference relative to the second time of day at the second geographical location where the working build is integrated;
   selecting, by the first computing device, in an order that differs from the chronological order in which the plurality of software patches were received by the first computing device, a first software patch having a highest priority score among the software patches in the queue; and
   integrating the first software patch into the working build, resulting in an updated working build that comprises a functionality of the first software patch.

6. The computer-implemented method of claim 5 wherein the respective priority score assigned to a given software patch in the queue is further based on at least one of:
   (a) a geographical location where the given software patch was submitted for integration into the working build,
   (b) an indication that the given software patch fixes a problem of an earlier software patch that failed integration into the working build,
   (c) an indication that the given software patch previously had its priority score lowered due to a failed dependency on an antecedent software patch and which dependency is currently satisfied,
   (d) an indication that the given software patch was successfully tested with one or more customers before being submitted for integration into the working build, and
   (e) whether the given software patch was submitted by a user who has at least one other software patch assigned to a pool of software patches that previously failed integration.

7. The computer-implemented method of claim 5 wherein before assigning the respective priority score to a given software patch submitted by a user who has at least one other software patch assigned to a pool of software patches that previously failed integration, removing the given software patch from the queue.

8. A computer-implemented method for managing software patch submissions for integration into a working build, the method comprising executing on a first computing device the steps of:
   receiving for integration into a first set of executable software files that collectively defines a working build, by the first computing device, a plurality of software patches arriving in a chronological order from one or more second computing devices,
      wherein each software patch comprises one or more executable software files;
   queueing, by the first computing device, the plurality of received software patches into a queue;
   assigning, by the first computing device, to each software patch in the queue, a respective priority score based on at least one of:
      (a) an indication that the respective software patch fixes a problem of an earlier software patch that failed integration into the working build,
         wherein the respective priority score of a given software patch in the queue is raised on the indication that the given software patch fixes a problem of an earlier software patch that failed integration into the working build, and
      (b) an indication that the respective software patch previously had its priority score lowered due to a failed dependency on an antecedent software patch,
         wherein the respective priority score of a given software patch in the queue is raised on the indication that the given software patch previously had its priority score lowered due to a failed dependency on an antecedent software patch and which dependency is currently satisfied;
   selecting, by the first computing device, in an order that differs from the chronological order in which the plurality of software patches were received by the first computing device, a first software patch having a highest priority score among the software patches in the queue; and
   integrating the first software patch into the working build, resulting in an updated working build that comprises a functionality of the first software patch.

9. The computer-implemented method of claim 8 wherein before assigning the respective priority score to a given software patch submitted by a user who has at least one other software patch assigned to a pool of software patches that previously failed integration, removing the given software patch from the queue.

10. A system for managing software patch submissions for integration into a working build, the system comprising a first computing device that comprises one or more processors and computer memory, wherein the first computing device is configured to:
   receive, for integration into a first set of executable software files that collectively defines a working build, a plurality of software patches from one or more second computing devices, wherein each software patch comprises one or more executable software files;
queue the plurality of received software patches into a queue;
assign to each software patch in the queue, a respective priority score based on:
(a) a geographical location where the respective software patch was submitted for integration into the working build,
(b) a time of day at a geographical location where the respective software patch was submitted for integration into the working build,
(c) an indication that the respective software patch fixes a problem of an earlier software patch that failed integration into the working build,
(d) an indication that the respective software patch previously had its priority score lowered due to a failed dependency on an antecedent software patch and which dependency is currently satisfied,
(e) an indication that the respective software patch was successfully tested with one or more customers before being submitted for integration into the working build, and
(f) whether the respective software patch was submitted by a user who has at least one other software patch assigned to a pool of software patches that previously failed integration; and
select for integration into the working build, in an order that differs from a chronological order in which the plurality of software patches were received by the first computing device, a first software patch having a highest priority score among the software patches in the queue; and
integrate the first software patch into the working build, resulting in an updated working build that comprises a functionality of the first software patch.

11. The system of claim 10 wherein the first computing device is further configured to (i) raise the respective priority score of a given software patch when a first geographical location where the given software patch was submitted is below a predefined geographical difference relative to a second geographical location where the working build is integrated, and (ii) lower the respective priority score of the given software patch when the first geographical location where the given software patch was submitted is more than the predefined geographical difference relative to the second geographical location where the working build is integrated.

12. The system of claim 10 wherein the first computing device is further configured to: (i) raise the respective priority score of a given software patch when a first time of day at a first geographical location where the given software patch was submitted is below a predefined time difference relative to a second time of day at a second geographical location where the working build is integrated, and (ii) lower the respective priority score of the given software patch when the first time of day at the first geographical location where the given patch was submitted is more than the predefined time difference relative to the second time of day at the second geographical location where the working build is integrated.

13. The system of claim 10 wherein the first computing device is further configured to raise the respective priority score of a given software patch on the indication that the given software patch fixes a problem of an earlier software patch that failed integration into the working build.

14. The system of claim 10 wherein the first computing device is further configured to raise the respective priority score of a given software patch on the indication that the given software patch previously had its priority score lowered due to a failed dependency on an antecedent software patch and which dependency is currently satisfied.

15. The system of claim 10 wherein the first computing device is further configured to raise the respective priority score of a given software patch on the indication that the given software patch was successfully tested with the one or more customers before being submitted for integration into the software build.

16. The system of claim 10 wherein the first computing device is further configured to lower the respective priority score of a given software patch when the given software patch was submitted by a user who has at least one other software patch assigned to a pool of software patches that previously failed integration.

17. The system of claim 10 wherein the first computing device is further configured to remove a given software patch from the queue before assigning the respective priority score to the given software patch which was submitted by a user who has at least one other software patch assigned to a pool of software patches that previously failed integration.

* * * * *